(12) United States Patent
Ichikawa et al.

(10) Patent No.: US 7,316,569 B2
(45) Date of Patent: Jan. 8, 2008

(54) EVALUATION APPARATUS OF SCIENTIFIC PHENOMENA, EDUCATIONAL TOOL FOR SCIENTIFIC EXPERIMENTS AND METHOD OF MANUFACTURING THE SAME

(75) Inventors: Yasunori Ichikawa, Minami-Ashigara (JP); Tomohide Ueyama, Minami-Ashigara (JP); Fumiko Shiraishi, Minami-Ashigara (JP); Seiji Sugiyama, Minami-Ashigara (JP); Teruo Fujii, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 11/061,744

(22) Filed: Feb. 22, 2005

(65) Prior Publication Data
US 2005/0186546 A1    Aug. 25, 2005

(30) Foreign Application Priority Data

Feb. 20, 2004   (JP)   ............................. 2004-045314
Feb. 20, 2004   (JP)   ............................. 2004-045319

(51) Int. Cl.
   *G09B 23/06*   (2006.01)
(52) U.S. Cl. ...................................... 434/283; 434/276
(58) Field of Classification Search ................ 434/126, 434/276, 283, 298, 299, 300, 370
   See application file for complete search history.

(56) References Cited

U.S. PATENT DOCUMENTS

| | | | | |
|---|---|---|---|---|
| 1,939,776 A | * | 12/1933 | Holmes et al. | ............. 434/126 |
| 1,947,605 A | * | 2/1934 | Linney | ........................ 434/370 |
| 2,848,822 A | * | 8/1958 | Morse | ......................... 434/126 |
| 3,382,593 A | * | 5/1968 | Couch | ......................... 434/126 |
| 3,564,733 A | * | 2/1971 | Field | ........................... 434/126 |
| 4,034,493 A | | 7/1977 | Ball | |
| 4,290,759 A | * | 9/1981 | Seabourn et al. | ........... 434/370 |
| 4,472,145 A | * | 9/1984 | Freeman et al. | ............ 434/298 |
| 5,242,307 A | | 9/1993 | Reinbold | |
| 6,254,396 B1 | | 7/2001 | Stevens | |
| 2006/0166177 A1 | * | 7/2006 | Hageman | .................... 434/276 |

FOREIGN PATENT DOCUMENTS

| DE | 200 05 052 U1 | 8/2000 |
|---|---|---|
| JP | 2000-242162 A | 9/2000 |

OTHER PUBLICATIONS

Japanese Abstract No. 2000242162, dated Sep. 8, 2000.

* cited by examiner

*Primary Examiner*—Kurt Fernstrom
(74) *Attorney, Agent, or Firm*—Sughrue Mion, Pllc.

(57) ABSTRACT

An evaluation apparatus of scientific phenomena, including:
a base plate of a plate-like body on whose surface is formed an elongated groove having a transversely cross-sectional area of not more than 1 mm²; and
a cover plate that is disposed on a surface of the base plate in close contact therewith and forms a fine flow passage on the base plate by covering the elongated groove, wherein scientific phenomena in the fine flow passage can be visually recognized.

20 Claims, 6 Drawing Sheets

EVALUATION APPARATUS OF SCIENTIFIC PHENOMENA, EDUCATIONAL TOOL FOR SCIENTIFIC EXPERIMENTS AND METHOD OF MANUFACTURING THE SAME

BACKGROUND OF THE INVENTION

1. Field of the Invention

The present invention relates to an evaluation apparatus of scientific phenomena, an educational tool for scientific experiments and a method of manufacturing the evaluation apparatus and educational tool and, more particularly, to an evaluation apparatus of scientific phenomena and an educational tool for scientific experiments that are inexpensive, cause only small environmental burdens and are suitable for enjoying high technologies quite easily and a method of manufacturing the evaluation apparatus and educational tool.

2. Description of the Related Art

For evaluation apparatus of scientific phenomena and educational tools for scientific experiments, those having various constructions have hitherto been proposed (refer to the Japanese Patent Application Laid Open No. 2000-242162).

For example in the Japanese Patent Application Laid Open No. 2000-242162, there is disclosed an educational tool of science that enables natural phenomena by changes in water temperature to be observed by causing the steam in the air or the water or steam contained in a container to be cooled or frozen, and this educational tool of science is small in size and simple in construction and is said to be able to faithfully reproduce various kinds of natural phenomena by changes in water temperature.

For chemical experiment apparatus for educational purposes, experiment kits such as "Science and Learning—Experiment Kit Series", "Science for Grownups—Analysis Kits for the Global Environment", and the like have been placed on the market. These experiment kits are on sale with relatively low prices of several hundreds to three thousand yen or so. They are experiment kits that give dreams to children and the pleasure of experiments to users and are enjoying great popularity.

SUMMARY OF THE INVENTION

However, conventional evaluation apparatus of scientific phenomena of this kind as described in the Japanese Patent Application Laid Open No. 2000-242162 are relatively complicated in construction, and it is difficult to supply them at low prices. Therefore, they are not suitable for the purchase by all students of a class.

On the other hand, experiment kits having relatively simple construction are mostly relatively low priced and suitable for the purchase and use by all students of a class. However, many of such experiment kits are insufficient in terms of finishing accuracy and the consumption of chemical agents and the like is large. Therefore, when all students of a class use such experiment kits, this causes environmental burdens in terms of waste liquid treatment, for example, and this is undesirable.

Furthermore, the contents of experiments capable of being experienced with conventional experiment kits are classical scientific experiment methods, and it is only with very limited conventional experiment kits that students can enjoy high technologies quite easily. In particular, high technologies such as microtechnology and nanotechnology have recently come under the spotlight and there are requests for educational tools for experiments that enable the diffusion phenomenon of substances occurring in microchannels, which are fine flow passages, to be observed quite easily. However, what is necessary for microscopic scientific experiments is fine flow passages having very high accuracy, and how accurately and at low cost such fine flow passages are assembled is important for performing scientific experiments.

The present invention has been made in view of the above circumstances and has as its object the provision of an evaluation apparatus of scientific phenomena and an educational tool for scientific experiments that are inexpensive, cause only small environmental burdens and are suitable for enjoying high technologies quite easily, and a method of manufacturing the evaluation apparatus and educational tool.

To achieve the above object, the present invention provides an evaluation apparatus of scientific phenomena, which comprises: a base plate of a plate-like body on whose surface is formed a long or elongated groove having a transversely cross-sectional area of not more than 1 $mm^2$; and a cover plate that is disposed on a surface of the base plate in close contact therewith and forms a fine flow passage on the base plate by covering the long groove, and in which scientific phenomena in the flow passage can be visually recognized.

To achieve the above object, the invention also provides an evaluation apparatus of scientific phenomena, which comprises: a base plate on a plate-like surface of which there is formed a long groove having a cross-sectional area of not more than 1 $mm^2$; a cover plate that is disposed on a surface of the base plate in close contact therewith and forms a fine flow passage on the base plate by covering the long groove; and a casing that supports the base plate and the cover plate by sandwiching the base plate and the cover plate that are fitted against each other from both sides of the plates, and in which scientific phenomena in the flow passage can be visually recognized.

According to the invention, a fine flow passage having a cross-sectional area of not more than 1 $mm^2$ is formed and, therefore, accuracies sufficient for experiencing high technologies are obtained. Accuracies for experiencing high technologies, for example, various phenomena such as the diffusion phenomenon of a liquid, heat transfer phenomenon of a liquid, mixing phenomenon of liquids and chemical reactions of a liquid (for example, an acid-alkali reaction, a hydrolysis reaction) that occur in this fine flow passage are obtained, consumption of chemical agents and the like is small and environmental burdens are small. Therefore, this evaluation apparatus of scientific phenomena is appropriate as an educational tool for scientific experiments.

Because the base plate and the cover plate are sandwiched by the casing from both sides, the adhesion between the base plate and the cover plate is improved. The casing can be constituted, for example, by a pair of transparent holder plates to be applied to both sides of the base plate and the cover plate that are fitted against each other and connecting device that connects the holder plates together so as to sandwich the base plate and the cover plate. Therefore, during experiments, liquid leakage from between the base plate and the cover plate does not occur and a breakage of the cover plate can also be prevented.

Incidentally, the cross-sectional area of the fine flow passage is not more than 1 $mm^2$, more preferably 0.0025 to 0.64 $mm^2$, and most preferably 0.01 to 0.25 $mm^2$.

In the invention, it is preferred that the base plate and/or the cover plate be transparent. Also, in the invention, it is preferred that the base plate and/or the cover plate be formed from a resin material. When the base plate and/or the cover plate is transparent, scientific phenomena in the flow passage can be visually recognized. When the base plate and/or the cover plate is formed from a resin material, the evaluation apparatus can be supplied at low cost.

Also, in the invention, it is preferred that an end of each of multiple flow passages join in at one meeting place and that the other end of each of the multiple flow passages be in communication with a liquid reservoir each having a volume of 5 to 5000 $mm^3$. Because in this manner an end of each of the multiple flow passages joins in at one meeting place and the other end of each of the multiple flow passages is in communication with a liquid reservoir, it is possible to carry out various kinds of experiments.

Incidentally, a "liquid reservoir" is usually hollow and chemical agents and the like are supplied to this part when this evaluation apparatus is operated.

In the invention, it is preferred that an end of a first flow passage and an end of a second flow passage meet each other at one meeting point, the first and second flow passages having almost the same length, that the other end of the first flow passage be in communication with a first liquid reservoir having a volume of 5 to 5000 $mm^3$, that the other end of the second flow passage be in communication with a second liquid reservoir having a volume of 5 to 5000 $mm^3$, that an end of a third flow passage be in communication with the meeting point, and that the other end of the third flow passage be in communication with a third reservoir having a volume of 5 to 5000 $mm^3$.

By constructing an evaluation apparatus by three flow channels and flow liquid reservoirs like this, the diffusion phenomenon and the like that occur in microchannels can be verified in a simple method and this construction is suitable for enjoying high technologies quite easily.

In the invention, it is preferred that in the cover plate there be formed a through hole that permits communication of outside air with at least one of the first reservoir, the second reservoir and the third reservoir. When the liquid reservoir and outside air are in communication with each other, it is possible to easily perform the control of each phenomenon occurring in microchannels.

Also, to achieve the above object, the invention provides an educational tool for scientific experiments in which the evaluation apparatus of scientific phenomena is a portable experiment apparatus. This is because the evaluation apparatus is very effective as an educational tool for scientific experiments.

The invention provides a method of manufacturing the evaluation apparatus of scientific phenomena or the educational tool for scientific experiments, which comprises the steps of: applying a resin material to a surface of a reverse template on the surface of which a reverse shape of the long groove of the base plate is formed; causing the resin material to cure; and stripping the resin material after curing from the reverse template thereby to form the base plate.

According to the invention, because the base plate is formed by printing by use of a reverse template on the surface of which a reverse shape of the long groove is formed, it is possible to supply the base plate with good accuracy and at low cost and to make the evaluation apparatus at low cost. Regardless of the expression "applying a resin material to a surface of a reverse template . . . ; causing the resin material to cure", a method that involves applying a resin material to the surface of the reverse template and forming the shape of the long groove by printing by use a hot press is also based on the same technical philosophy and it can be said that such a method is within the scope of the present invention.

Incidentally, scientific phenomena are various chemical phenomena, physical phenomena and the like of a liquid that occur in the above-described fine flow passage and include the diffusion phenomenon of a liquid, heat transfer phenomenon of a liquid, mixing phenomenon of liquids and chemical reactions of a liquid (for example, an acid-alkali reaction, a hydrolysis reaction).

Also, to achieve the above object, the invention provides a method of manufacturing the evaluation apparatus of scientific phenomena or a method of manufacturing the educational tool for scientific experiments, which comprises: the base plate forming step that involves, by use of a reverse template on the surface of which a reverse shape of the long groove to be formed on the base plate is formed, applying a resin material to a surface of the reverse template, causing the resin material to cure, and stripping the resin material after curing from the reverse template thereby to form the base plate; the fitting step that involves fitting the cover plate against the surface of the base plate to cover the long groove, whereby the fine flow passage is formed on the base plate; and the casing mounting step that involves mounting a casing on the base plate and the cover plate that are fitted against each other and supporting the base plate and the cover plate so as to sandwich the plates, whereby the base plate and the cover plate are brought into close contact with each other.

According to the invention, because in the base plate forming step, the base plate is formed by printing by use of a reverse template on the surface of which a reverse shape of the long groove is formed, it is possible to supply the base plate with good accuracy and at low cost and to make the evaluation apparatus at low cost.

Next, in the fitting step, the casing is mounted to the base plate and the cover plate that are fitted against each other to support the base plate and the cover plate so as to sandwich the plates. And in the subsequent casing mounting step, the casing is mounted to the base plate and the cover plate that are fitted against each other to support the base plate and cover plate so as to sandwich the plates. As a result of this, the fine flow passage can be assembled with good accuracy and, therefore, during experiments, liquid leakage from between the base plate and the cover plate does not occur and a breakage of the cover plate can also be prevented. Therefore, according to a manufacturing method of the invention, the fine flow passage can be assembled with good accuracy and at low cost. A method of manufacturing the evaluation apparatus of scientific phenomena or a method of manufacturing the educational tool for scientific experiments by use of this reverse template is especially suitable for a case where a soft resin is used as the resin material.

Also, to achieve the above object, the invention provides a method of manufacturing the evaluation apparatus of scientific phenomena or a method of manufacturing the educational tool for scientific experiments, which comprises: the base plate forming step that involves forming the long groove on the surface of the base plate by any one of the micromachining processes of machine-working by use of a machining center and the like, electrical discharge machining, ultrasonic machining, photoetching and microdrilling; the fitting step that involves fitting the cover plate against the surface of the base plate to cover the long groove, whereby the fine flow passage is formed on the base plate; and the casing mounting step that involves mounting a casing on the base plate and the cover plate that are fitted against each other and supporting the base plate and the cover plate so as to sandwich the plates, whereby the base plate and the cover plate are brought into close contact with each other.

According to the invention, because in the base plate forming step, the long groove is formed on the surface of the base plate by any one of the micromachining processes of machine-working by use of a machining center and the like, electrical discharge machining, ultrasonic machining, photoetching and microdrilling, it is possible to supply the base plate with good accuracy and at low cost and to make the evaluation apparatus at low cost.

Next, in the fitting step, the casing is mounted to the base plate and the cover plate that are fitted against each other to support the base plate and the cover plate so as to sandwich the plates. And in the subsequent casing mounting step, the casing is mounted to the base plate and the cover plate that are fitted against each other to support the base plate and cover plate so as to sandwich the plates. As a result of this, the fine flow passage can be assembled with good accuracy and, therefore, during experiments, liquid leakage from between the base plate and the cover plate does not occur and a breakage of the cover plate can also be prevented. Therefore, according to a manufacturing method of the invention, the fine flow passage can be assembled with good accuracy and at low cost. A method of manufacturing the evaluation apparatus of scientific phenomena or a method of manufacturing the educational tool for scientific experiments by use of this micromachining process is especially suitable for a case where a soft resin is used as the resin material.

In the invention, it is preferred that a pair of transparent holder plates be applied to both sides of the base plate and the cover plate that are fitted against each other and that the holder plates be connected together by use of a connecting device so as to be sandwiched. By sandwiching the base plate and the cover plate that are fitted against each other by use of a pair of transparent holder plates on both sides of the plates, it is unnecessary to perform working for improving adhesion and, at the same time, by using a pair of transparent holder plates, scientific phenomena in the flow passage can be visually verified.

As described above, according to the invention, the fine flow passage having a cross-sectional area of not more than 1 $mm^2$ is formed in this evaluation apparatus and, therefore, accuracies sufficient for experiencing high technologies are obtained, the consumption of chemical agents and the like is small, and environmental burdens are small.

By providing the casing, a fine flow passage that is free from liquid leakage and the like can be assembled with very good accuracy and at low cost.

DETAILED DESCRIPTION OF THE PREFERRED EMBODIMENTS

Figure 1:
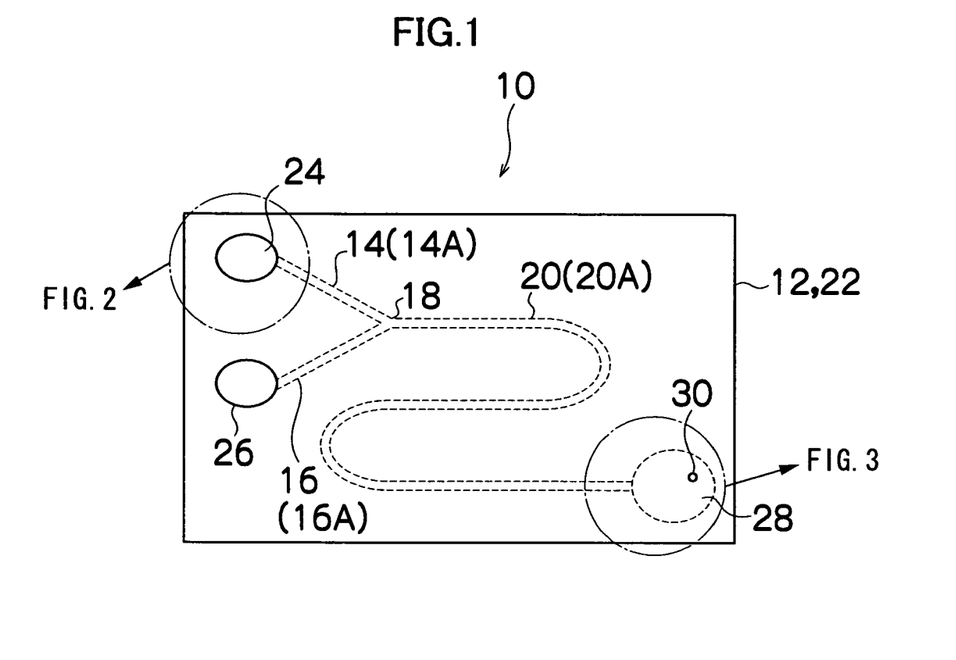
FIG. 1 is a plan view to explain the construction of an evaluation apparatus for scientific phenomena according to the invention.
Figure 2:
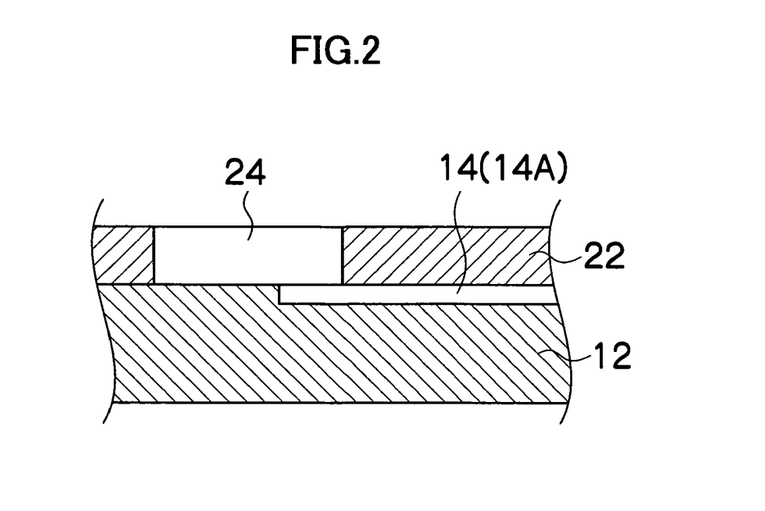
FIG. 2 is a partially enlarged view of FIG. 1.
Figure 3:
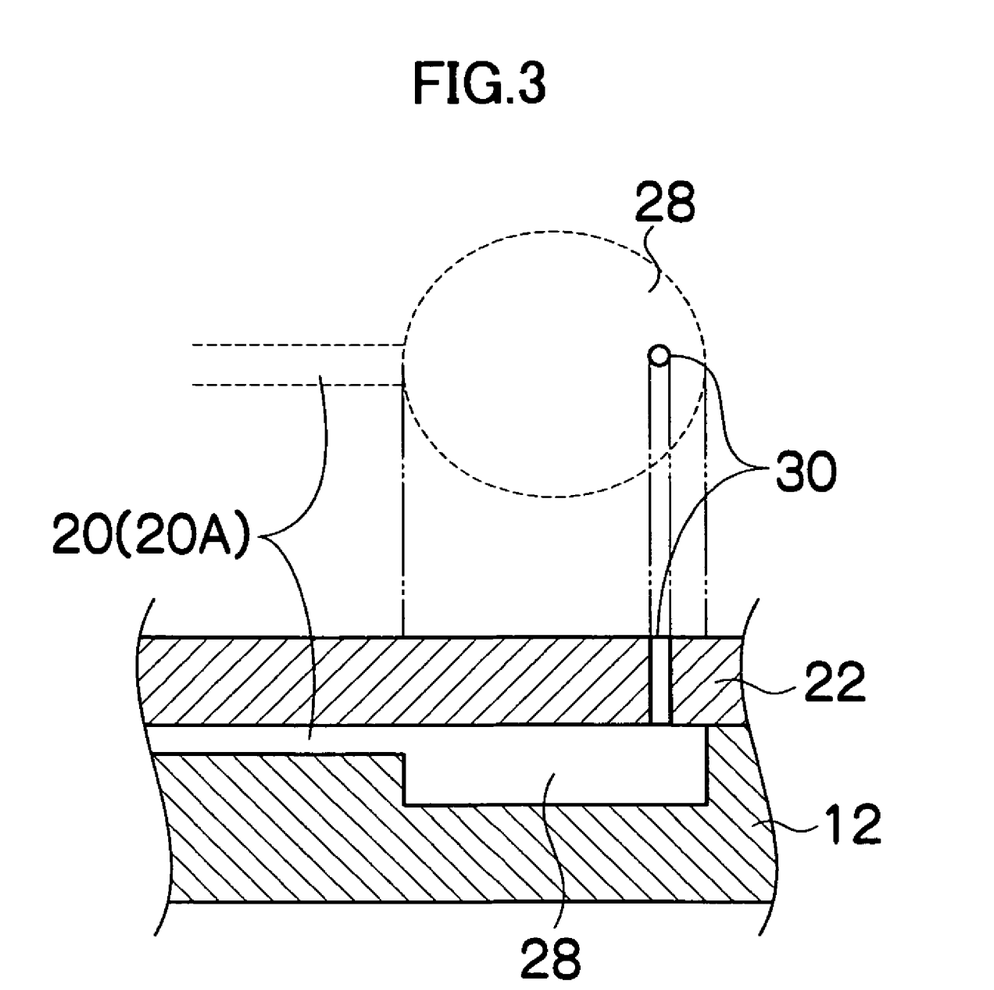
FIG. 3 is a partially enlarged sectional view of FIG. 1.

Preferred embodiments of an evaluation apparatus of scientific phenomena and an educational tool for scientific experiments according to the invention and of a method of manufacturing the evaluation apparatus and the educational tool will be described in detail below with reference to the drawings. FIG. 1 is a plan view to explain the construction of an educational tool for scientific experiments 10 that is an evaluation apparatus for scientific phenomena according to the invention. FIGS. 2 and 3 are a partially enlarged section and the like of FIG. 1, FIG. 2 shows a first liquid reservoir 24 (within the dotted line up left in FIG. 1), and FIG. 3 shows a third liquid reservoir 28 (within the dotted line down right in FIG. 1).

That is, the educational tool for scientific experiments 10 is constituted by a base plate 12 on a plate-like surface of which there are formed long or elongated grooves (14, 16 and 20), each having a cross-sectional area of not more than 1 $mm^2$, a cover plate 22 that is disposed on the surface of the base plate 12 in close contact therewith and forms fine flow passages (14A, 16A and 20A) on the base plate 12 by covering the long grooves.

The fine flow passages that are formed by the long grooves (14, 16 and 20) are constituted by a first flow passage 14A and a second flow passage 16A having almost the same length, which join in at a meeting point 18, and a third flow passage 20A that joints the first flow passage 14A and the second flow passage 16A at the meeting point 18.

The other end of the first flow passage 14A is in communication with a first liquid reservoir 24, which is a cylindrical hollow part formed on the cover plate 22, the other end of the second flow passage 16A is in communication with a second liquid reservoir 26, which is a cylindrical hollow part formed on the cover plate 22, and the other end of the third flow passage 20A is in communication with a third liquid reservoir 28, which is a cylindrical hollow part formed on the base plate 12.

Furthermore, in a part of the cover plate 22 corresponding to the third reservoir 28 there is formed a through hole 30 that permits communication between the third liquid reservoir 28 and outside air.

It is preferred that the volume of the first liquid reservoir 24, the second reservoir 26 and the third reservoir 28 be 5 to 5000 $mm^3$. By ensuring such volumes, the control of each phenomenon that occurs in the microchannels can be easily performed.

Although the two-dimensional size of the base plate 12 and cover plate 22 is not especially limited, from the nature of the educational tool 10 for scientific experiments that is used at school, it is possible to use portable sizes, for example, 80×50 mm. Also, the thickness of the base plate 12 and cover plate 22 is not especially limited. However, from the standpoint of strength, cost efficiency, etc., it is possible to adopt 5 mm or so, for example, for both.

Materials for the base plate 12 are not especially limited. However, from the standpoint of facilitating the manufacturing methods that will be described later, resins, more concretely, polydimethylsulfoxide (PDMS), polymethyl methacrylate (PMMA), polyvinyl chloride (PVC), ultraviolet curing resin, polycarbonate (PC), etc. can be advantageously used.

The cross-sectional area of the long grooves (14, 16 and 20) formed on the surface of the base plate 12 is not more than 1 mm$^2$ as stated earlier, more preferably 0.0025 to 0.64 mm$^2$ and most preferably 0.01 to 0.25 mm$^2$.

The cross-sectional shape of the long grooves (14, 16 and 20) is not especially limited and various shapes such as rectangle (square, oblong), trapezoid, V-shape and semi-circle can be adopted. However, from the standpoint of facilitating the manufacturing methods that will be described later, the rectangle (square, oblong) is preferable.

Materials for the cover plate 22 are not especially limited. However, transparent materials are preferable to ensure that the scientific phenomena in the flow passages can be recognized by the visual sense. As such materials, it is possible to adopt various kinds of resin plates, more concretely, polydimethylsulfoxide (PDMS), polymethyl methacrylate (PMMA), polyvinyl chloride (PVC), ultraviolet curing resin, polycarbonate (PC), etc., various kinds of resin films, more concretely, polyethylene terephthalate (PET), polyethylene naphthalate (PEN), triacethyl cellulose (TAC), etc., and various kinds of glasses (soda-lime glass, borosilicate glass, etc.).

In general, this cover plate 22 is formed from a flat plate the front and rear surfaces of which are flat. However, it is also possible to form the front surface that corresponds to the fine flow passages (14A, 16A and 20A) in a convex shape so as to permit observation in an enlarged condition.

Incidentally, it is also possible to adopt a construction in which the cover plate 22 is opaque and the base plate 12 is transparent.

It is preferred that for the front surface (the surface on which the long grooves are formed) of the base plate 12 and the rear surface (the surface that comes into close contact with the base plate 12) of the cover plate 22, sufficient flatness be ensured for the formation of the flow passages (14A, 16A and 20A) and from the standpoint of prevention of liquid leakage etc.

Next, a method of manufacturing the educational tool for scientific experiments 10 will be described blow.

As preferred methods of forming the base plate 12, there are available a method that involves using a reverse template 40 to form the base plate 12 and a method that involves using any one of the micromachining processes of machine-working by use of a machining center and the like, electrical discharge machining, ultrasonic machining, photoetching and microdrilling.

Figure 4A:
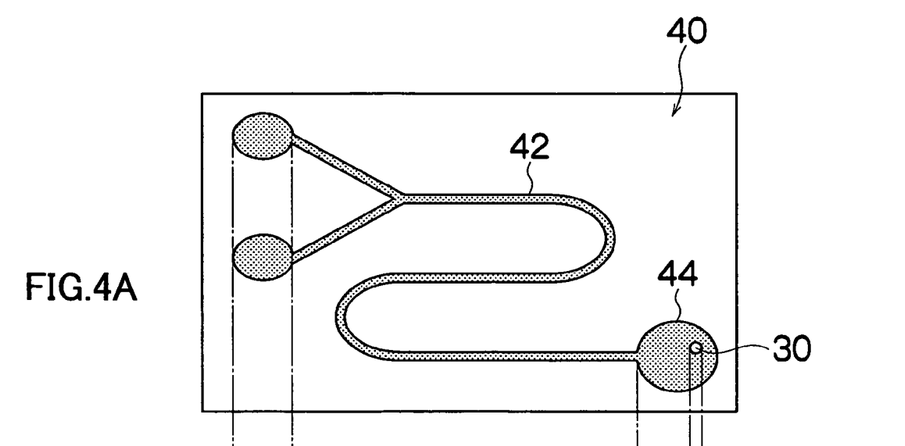
FIG. 4A to FIG. 4D are top views and side sectional view that show a reverse template and a cover plate, the reverse template being prepared when, in a method of manufacturing a scientific experiment apparatus, a base plate is fabricated by use of the reverse template.
Figure 4B:
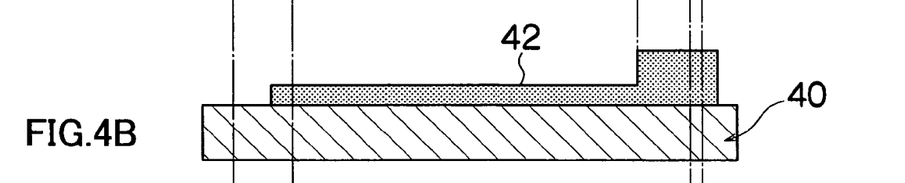
Figure 4C:
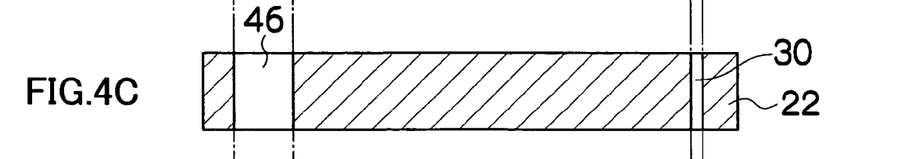
Figure 4D:
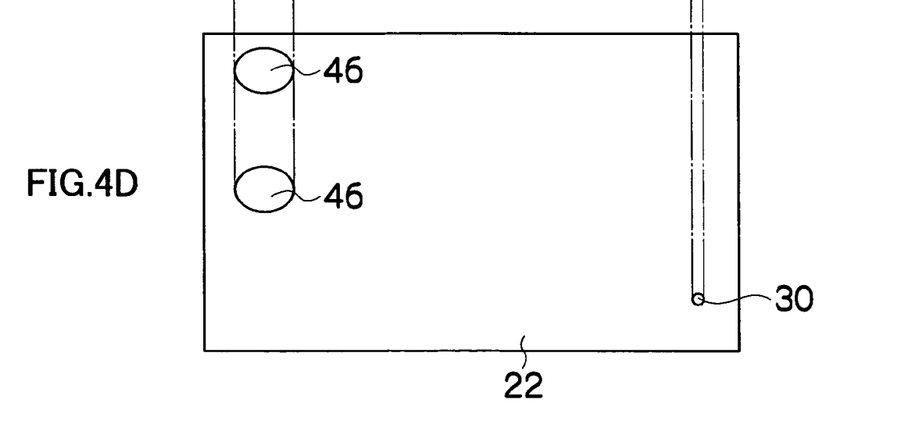

FIGS. 4A to 4D and FIGS. 5A to 5D show the method in which the reverse template 40 is used. FIG. 4A is a top view of the reverse template 40, FIG. 4B is a side view of the reverse template 40, FIG. 4C is a side sectional view of the cover plate 22, and FIG. 4D is a top view of the cover plate 22. Incidentally, a description will be made of a case where the first and second liquid reservoirs 24, 26 are formed on the cover plate 22 and the through hole 30 is omitted and, at the same time, the third liquid reservoir 28 is formed on the substrate 12 and the through hole 30 of the third reservoir 28 is formed in the cover plate 22.

First, the reverse template 40 on the surface of which the reverse shapes of the long grooves (14, 16 and 20) of the base plate 12 are formed is prepared. It is necessary that on the surface of this reverse template, the revere shape of the third liquid reservoir 28 be further formed beforehand. That is, on the surface of this reverse template 40 there are formed a convex flow passage pattern 42 that becomes the long grooves (14, 16 and 20) when reversed and a third liquid reservoir pattern 44. As a manufacturing method of this reverse template 40, it is possible to adopt various kinds of publicly known micromachining processes, such as machine-working by use of a machining center and the like, electrical discharge machining, ultrasonic machining, photoetching and microdrilling. In the cover plate 22, by use of a micromachining process two pattern forms 46, 46 that become the first liquid reservoir 24 and the second liquid reservoir 26 are drilled and, at the same time, the through hole 30 of the third liquid reservoir is drilled.

Subsequently, a release agent is applied to the surface of this reverse template 40. An appropriate release agent can be adopted according to the kind of a resin material that becomes the base plate 12, working conditions (temperature etc.) and the like.

Figure 5A:
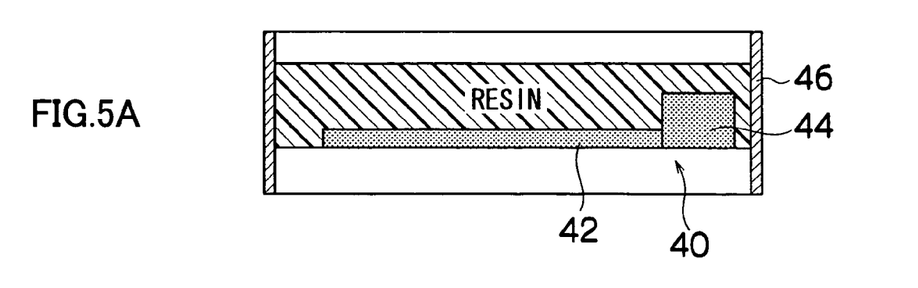
FIG. 5A to FIG. 5D are explanatory drawings to explain the procedure for manufacturing a scientific experiment apparatus.

Subsequently, as shown in FIG. 5A, after the periphery of the reverse template 40 is enclosed by the pattern form 46 is enclosed, a resin material is caused to flow onto and applied to the surface (on the side where the convex flow passage pattern 42 and the third liquid reservoir pattern 44 are formed) of the reverse template 40 and this resin material is caused to cure. When the resin material is, for example, an ultraviolet curing resin, the resin material after application is caused to cure by irradiation with ultraviolet rays. When the resin material is, for example, a thermosetting resin such as polyvinyl chloride (PVC), the resin material is applied to the surface of the reverse template 40 and hot printing is performed by use of a hot press machine.

Figure 5B:
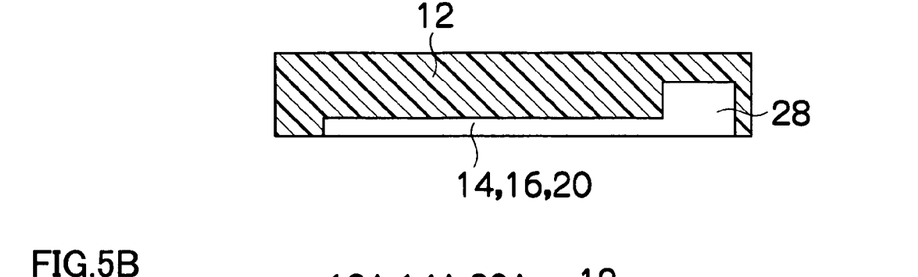

And as shown in FIG. 5B, the resin material after curing is stripped from the reverse template 40. As a result of this, the base plate 12 on which the long grooves (14, 16 and 20) and the third liquid reservoir 28 are formed is fabricated.

Next, the formed base plate 12 and the cover plate 22 of FIG. 4D, which has been prepared beforehand, are fitted against each other as shown in FIG. 5. The mating surfaces may be bonded together with an adhesive or the like.

Figure 5C:
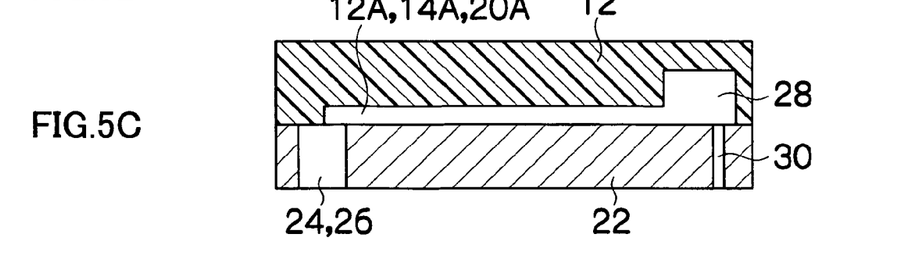
Figure 5D:
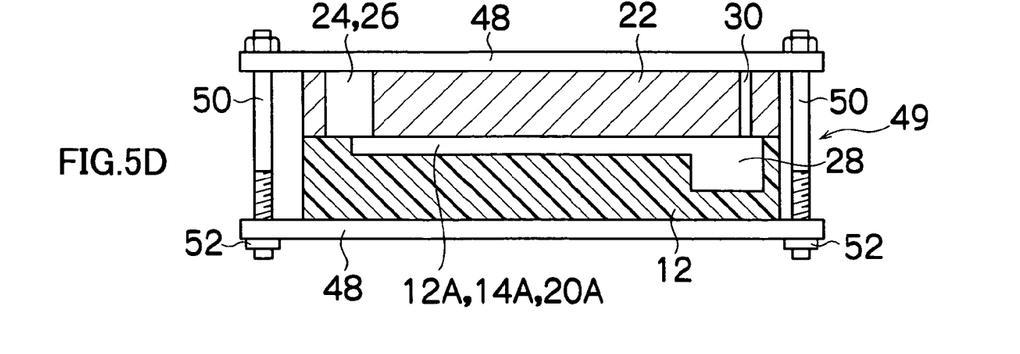

Next, as shown in FIG. 5D, after the base plate 12 and the cover plate 22 are turned upside down, a casing 49 is mounted to the base plate 12 and the cover plate 22. That is, a pair of transparent holder plates 48, 48 is applied to both sides of the base plate 12 and the cover plate 22 that are fitted against each other, and the holder plates 48 are connected together by being sandwiched by use of connecting devices that are multiple bolts 50, 50 . . . and nuts 52, 52 . . . In this case, it is preferred that with the base plate 12 and the cover plate 22 being fitted against each other, the holder plates be evenly sandwiched in places of at least four corners by use of the bolts 50 and the nuts 52. As a result of this, adhesion is improved and, therefore, liquid leakage from between the base plate 12 and the cover plate 22 does not occur during experiments, nor occurs a breakage of the base plate 12 and the cover plate 22.

In the case of a method of manufacturing the educational tool for scientific experiments 10 in which a micromachining process is used, a detailed description will be omitted, because the difference resides only in that any one of the micromachining processes of machine-working by use of a machining center and the like, electrical discharge machining, ultrasonic machining, photoetching and microdrilling is used in the formation of the base plate 12 in FIG. 5B in place of the reverse template 40 and the step of FIG. 5C and the step of FIG. 5D are the same.

The above-described method of manufacturing the educational tool for scientific experiments 10 in which the reverse template 40 is used, is especially suitable for a case where a soft resin is used as the resin material. In the case of polydimethylsulfoxide (PDMS) among other soft resins, because the adhesion between the base plate 12 and the cover plate 22 is excellent, it is possible to omit the mounting of the casing 49 in a case where PDMS is used in at least the base plate 12 even when the use of PDMS in both the cover plate 22 and the base plate 12 is not performed.

The above-described method of manufacturing the educational tool for scientific experiments 10 in which a micromachining process is used, is especially suitable for a case where a hard resin is used as the resin material. In the case of a hard resin, however, the adhesion between the base plate 12 and the cover plate 22 tends to worsen and by mounting the casing 49, liquid leakage from between the base plate 12 and the cover plate 22 can be positively prevented. For example, in the case of polymethyl methacrylate (PMMA) as the resin material for the base plate 12, the casing 49 is especially effective in improving the adhesion.

Next, how to use the educational tool for scientific experiments 10 according to the invention will be described below. As the educational tool for scientific experiments 10, it is necessary to supply the following members 1) to 12) below as a set:

1) Reverse template
2) Resin material for the base plate 12
3) Pattern form for forming the base plate 12
(Used as a pattern form when resin is poured during the formation of the base plate 12.)
4) Cover plate 22
5) Dropper for sample liquid
(Used to supply a necessary sample liquid (reagent) to the first liquid reservoir 24 and the second liquid reservoir 26 according to the test purpose. A dropper for exclusive use may be used for each chemical agent or one dropper may be used for all chemical agents after cleaning.)
6) Tape for sealing the sample liquid inlet and outlet
(Provides covers for the first liquid reservoir 24 and the second liquid reservoir 26 that are holes for supplying a sample liquid. Used to cover the first liquid reservoir 24 and the second liquid reservoir 26 after the supply of a sample liquid to the reservoirs 24, 26 by a pipette. Can also be used as the cover for the third liquid reservoir 28.)
7) Needle
(Used to make a hole in the tape as required when a sample liquid is supplied or recovered, in order to put air into the first liquid reservoir 24 and the second liquid reservoir 26 in an amount corresponding to a change in volume while the liquid is supplied or received.)
8) Casing 49
(This casing is mounted when this experiment set is assembled, in order to prevent liquid leakage from between the cover plate 22 and the base plate 12 and to prevent a breakage of the cover plate 22 and the like. Incidentally, it is possible to incorporate various functions that suit the purpose of an experiment in the casing 49, for example, the installation of a magnifying glass to facilitate an observation of the flow passage.)
9) Liquid delivering device
(When heat is applied to the first liquid reservoir 24 and the second liquid reservoir 26 (for example, the reservoirs 24, 26 are heated by body temperature by touching the tape with a finger tip), with the first liquid reservoir 24 and the second liquid reservoir 26 kept covered with the tape, cubical expansion occurs in the liquid and/or air in the first liquid reservoir 24 and the second liquid reservoir 26. It is possible to adopt a liquid delivering method using this phenomenon, a method of delivering a liquid in the interior of the first liquid reservoir 24 and the second liquid reservoir 26 by pressurizing the interior of the liquid reservoirs 24, 26 on the basis of the principle of pump, and the like.)

In this case, when tape is applied to the third liquid reservoir 28, a small hole is opened in the tape by use of the needle described in 7) above.

Also, when a sample liquid in the first liquid reservoir 24 and the second liquid reservoir 26 is put into the flow passages (14A, 16A and 20A) by reducing the pressure on the third liquid reservoir 28 by use of a pump or by placing ice blocks on the third liquid reservoir 28 and reducing the pressure by contracting the gas in the third liquid reservoir 28, liquid delivering is made possible by making a small hole in the tape covers of the first liquid reservoir 24 and the second liquid reservoir 26 by use of the needle described in 7) above.)

10) Sample liquid (reagent) for test
(Necessary chemical agents that suit the purpose are supplied in reagent containers as test reagents for performing this scientific experiment. As sample liquids, for example, coloring liquids represented by coloring matter or pigments, and transparent liquids such as water can be mentioned.)

11) Practical guide for experiments
(A guide that describes the purpose of experiments conducted by use of this set, descriptions of phenomena, applications and uses, and phenomena that can be learned with this set is attached as required.)

12) Procedural manual for experiment methods

Incidentally, although in this set the base plate 12 is to be made by hand by students, when the hand-making of the base plate 12 is omitted, a complete base plate 12 can be supplied in place of the members 1) to 3) above.

Details of experiments conducted by use of this set will be given below. FIGS. 6A to 6D and FIGS. 7A and 7B are sectional views to explain the procedure for an experiment method. FIGS. 6A to 6D show a time-series procedure in the first liquid reservoir 24 and the second liquid reservoir 26. On the other hand, FIG. 7A shows the condition of the start of an experiment in which a sample liquid is supplied to in the first liquid reservoir 24 and the second liquid reservoir 26, and FIG. 7B shows the state of the finish of the experiment in which the sample liquid has reached the third liquid reservoir 28.

Figure 6A:
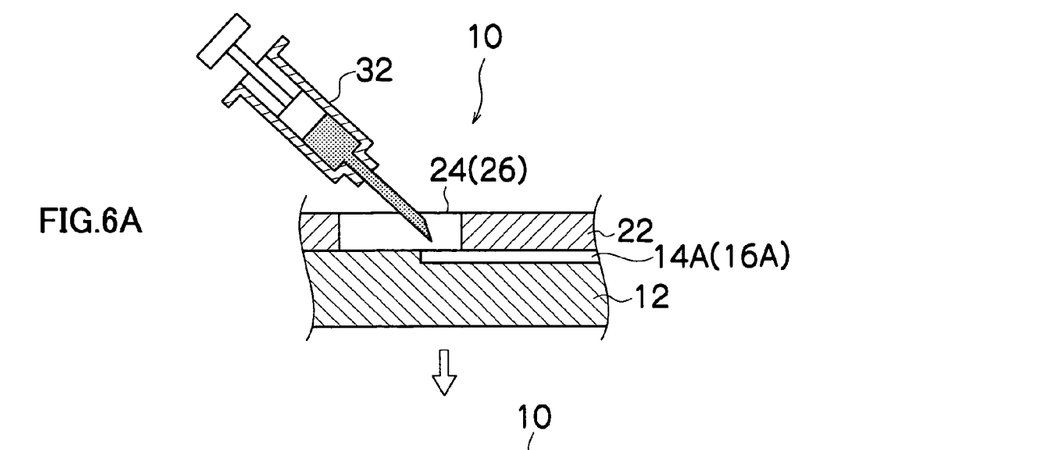
FIG. 6A to FIG. 6D are explanatory drawings to explain the procedure for an experiment method.
Figure 6B:
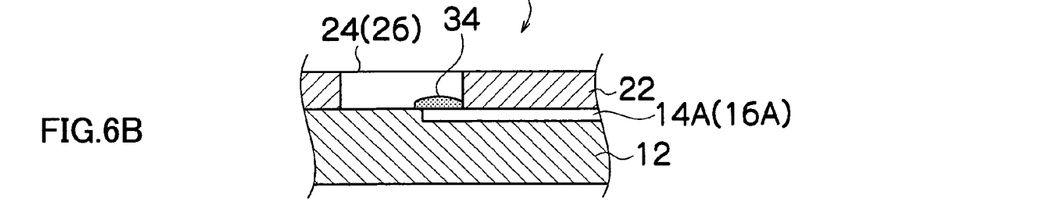
Figure 7A:
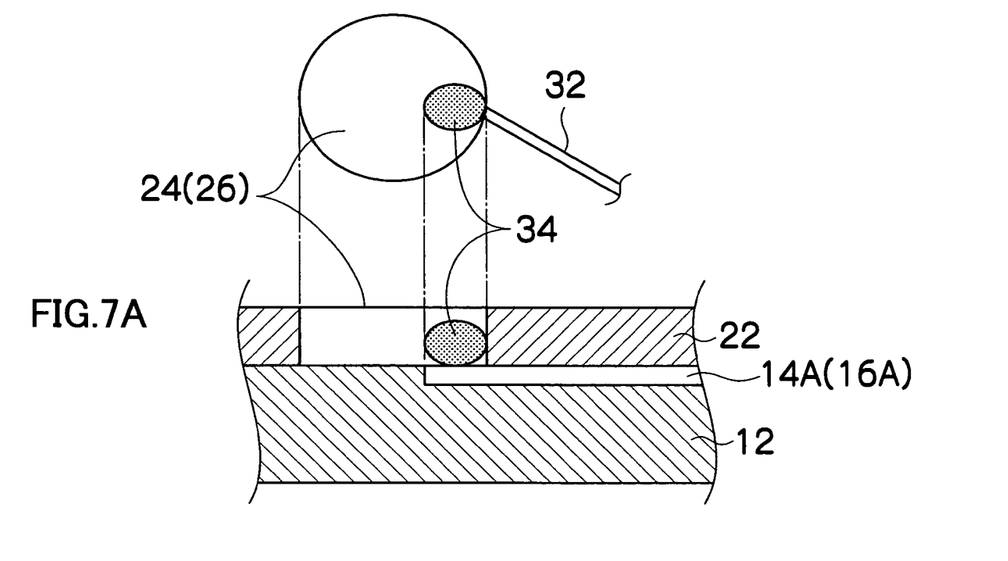
FIGS. 7A and 7B are explanatory drawings to explain the procedure for an experiment method.
Figure 7B:
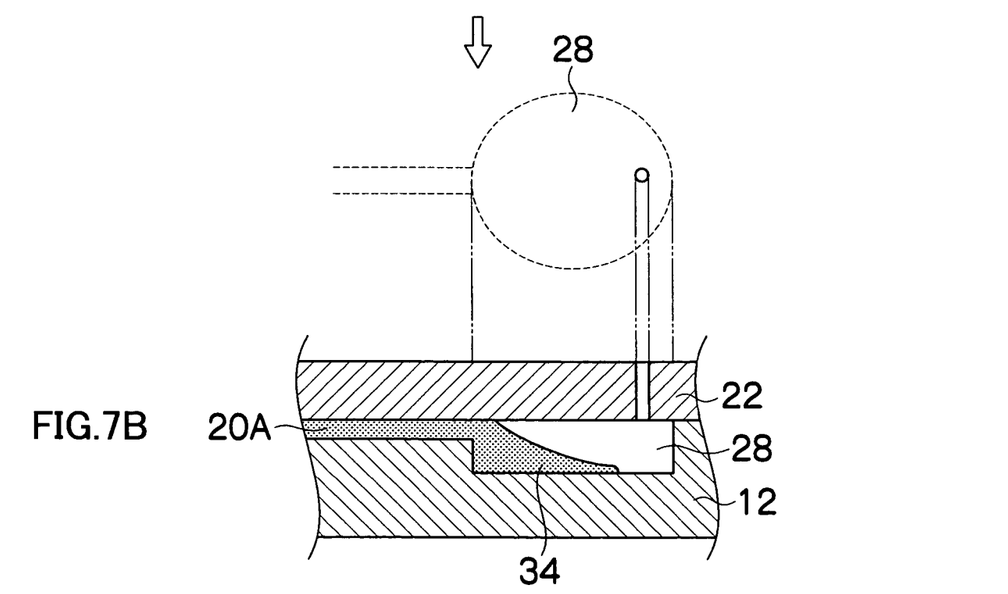

As shown in FIG. 6A, a prescribed amount of sample liquid 34 is supplied to the first liquid reservoir 24 (or the second liquid reservoir 26) by use of a dropper for sample liquid 32. As shown in FIG. 6(B) and FIG. 7(A), this sample liquid 34 is supplied so as to block a portion that is in communication with the flow passage 14A (or 16A) in the first liquid reservoir 24 (or the second liquid reservoir 26).

Figure 6C:
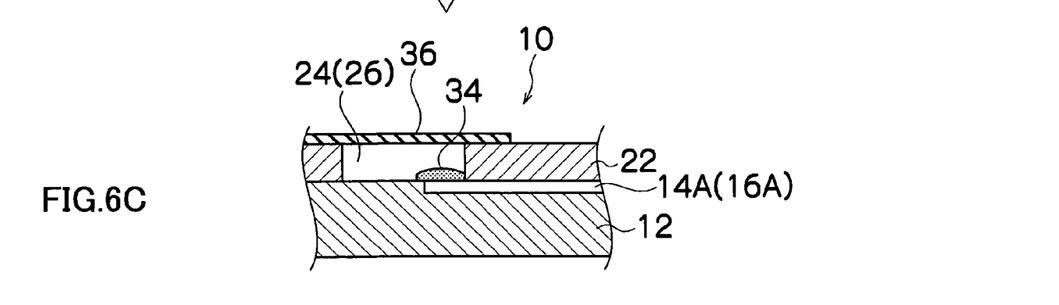

Subsequently, as shown in FIG. 6(C), the first liquid reservoir 24 (or the second liquid reservoir 26) is covered with a tape 36 for sealing the sample liquid inlet and outlet. In this tape 36, one surface (the bottom surface in the figure) thereof is coated with an adhesive and as a result of this, the first liquid reservoir 24 (or the second liquid reservoir 26) is shut off from outside air.

Figure 6D:
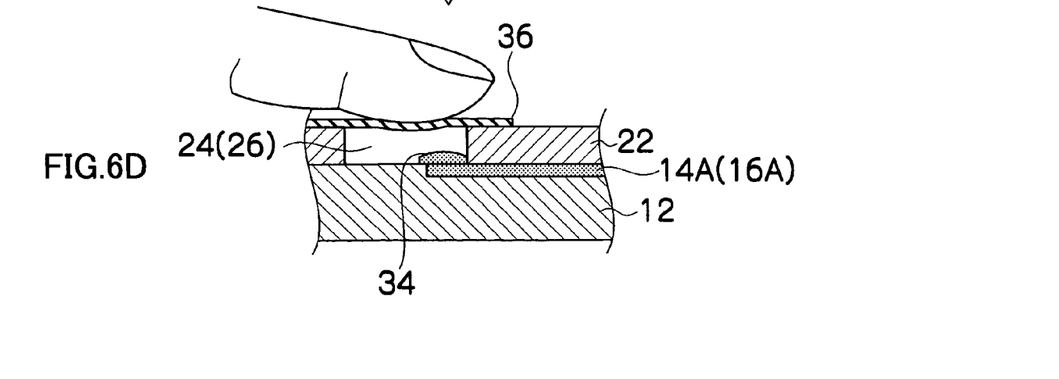

Subsequently, as shown in FIG. 6D, a finger tip 38 is brought into contact with the tape 36. As a result of this, a liquid delivering device is formed in the first liquid reservoir 24 (or the second liquid reservoir 26). As described above, this liquid delivering device is based on the principle that due to the heat from the finger tip 38, cubical expansion occurs in the gas in the first liquid reservoir 24 (or the second liquid reservoir 26), with the result that the sample liquid 34 is fed into the flow passage 14A (or 16A).

Also in a construction similar to that shown in FIG. 6D, this liquid delivering device may be based on the principle that by depressing the tape 36 with the finger tip 38, thereby to reduce the volume of the first liquid reservoir 24 (or the second liquid reservoir 26), the sample liquid 34 is fed into the flow passage 14A (or 16A).

As shown in FIG. 7B, the sample liquid 34 reaches the third liquid reservoir 28 by use of the above-described liquid delivering device and the experiment is finished. On that occasion, by delivering sample liquids 34 into the flow passage 14A and the flow passage 16A at the same time from the first liquid reservoir 24 and the second liquid reservoir 26 each by use of a liquid delivering device, it is possible to observe how the sample liquids 34 joins in at the meeting point 18.

In particular, by changing the color of the sample liquids 34 to be supplied to the first liquid reservoir 24 and the second liquid reservoir 26, it becomes easy to observe how the sample liquids 34 join in at the meeting point 18. For example, a colored sample liquid 34 is supplied to the first liquid reservoir 24 and a transparent and colorless sample liquid 34 is supplied to the second liquid reservoir 26.

By observing the flow passage 20A behind the meeting place 18 of the sample liquids 34 that flow in this manner, a person who is carrying out the experiment can recognize how coloring molecules of the coloring matter or pigment diffuse from the side of the colored liquid flowing in the microchannels into the transparent liquid.

Furthermore, by changing not only the color of the sample liquids 34 supplied to the first liquid reservoir 24 and the second liquid reservoir 26, but also their viscosity, how the sample liquids 34 join in at the meeting point 18 can be observed in a different manner.

Incidentally, in order to ensure that these phenomena can be more easily observed, it is also possible to use a reading glass or a magnifying glass. Furthermore, as stated previously, it is also possible to give the function of a magnifying glass (the lens function) to the cover plate 22 in the flow passage 20A.

According to the educational tool for scientific experiments 10 described above, in order to ensure that children can perform scientific experiments in the microscopic world with pleasure, important parts are simplified as far as possible, thereby making it possible to supply this educational tool at low cost, and besides experiments can be conducted with high accuracy.

In particular, when the diffusion phenomena of molecules that provide the basis of chemical reactions are qualitatively observed, in order to improve the experiment accuracy, it is very important that multiple liquids flow in the flow passages be at least under the same conditions. And this educational tool can sufficiently meet this requirement. That is, it is possible to conduct experiments with relatively good accuracy by use of a very simple and inexpensive device. Furthermore, because experiments are conducted in the microscopic world, consumption of chemical agents represented by coloring matter or pigments and the like is very small and environmental burdens can be substantially reduced.

Although the embodiments of an evaluation apparatus of scientific phenomena and an educational tool for scientific experiments according to the present invention and of a method of manufacturing the evaluation apparatus and educational tool have been described above, the invention is not limited to the above-described embodiments and it is possible to adopt various kinds of aspects.

For example, in this embodiment, the description has been given of the example of the educational tool for experiments in which two kinds of sample liquids 34 join in at the meeting point 18 and the phenomenon that coloring molecules of coloring matter or pigments diffuse toward a transparent liquid can be observed. However, this educational tool for scientific experiments can also be applied as various educational tools for scientific experiments other than this.

Furthermore, in this embodiment, the first liquid reservoir 24 and the second liquid reservoir 26 are formed on the cover plate 22 and the third liquid reservoir 28 is formed on the base plate 12. However, it is possible to aspects other than this; for example, all liquid reservoirs can be formed on the cover plate 22.

Although in this embodiment, three sets of flow passages and liquid reservoirs are provided, it is possible to adopt a constitution in which four or more sets are provided.

Furthermore, although the dropper for sample liquid 32 is used to supply a sample liquid (reagent) to the liquid reservoirs (24, 26, etc.), in place of this it is also possible to use an injector, a microsyringe, etc. having the same function. In general, it is desirable to use an inexpensive dropper as an educational tool for scientific experiments. However, according to the purpose of a test, it may sometimes be desirable to use the above-described injector, microsyringe, etc. having the same function.

What is claimed is:

1. An evaluation apparatus of scientific phenomena, comprising:
    a base plate of a plate-like body on whose surface is formed an elongated groove having a transversely cross-sectional area of not more than 1 $mm^2$; and
    a cover plate that is disposed on a surface of the base plate in close contact therewith and forms a fine flow passage on the base plate by covering the elongated groove, wherein scientific phenomena in the fine flow passage can be visually recognized.

2. An evaluation apparatus of scientific phenomena, comprising:
    a base plate of a plate-like body on whose surface is formed an elongated groove having a transversely cross-sectional area of not more than 1 $mm^2$; and
    a cover plate that is disposed on a surface of the base plate in close contact therewith and forms a fine flow passage on the base plate by covering the elongated groove; and
    a casing that supports the base plate and the cover plate by sandwiching the base plate and the cover plate that are fitted against each other from both sides of the plates, wherein scientific phenomena in the fine flow passage can be visually recognized.

3. The evaluation apparatus of scientific phenomena according to claim 1, wherein the base plate and/or the cover plate is transparent.

4. The evaluation apparatus of scientific phenomena according to claim 1, wherein the base plate and/or the cover plate is formed from a resin material.

5. The evaluation apparatus of scientific phenomena according to claim 2, wherein the casing is constituted by a pair of transparent holder plates to be applied to both sides of the base plate and the cover plate that are fitted against each other and a connecting device that connects the holder plates so as to sandwich the base plate and the cover plate.

6. The evaluation apparatus of scientific phenomena according to claim 1, wherein an end of each of the multiple flow passages joins in at one meeting place and the other end of each of the multiple flow passages is in communication with a liquid reservoir each having a volume of 5 to 5000 mm$^3$.

7. The evaluation apparatus of scientific phenomena according to claim 1, wherein the fine flow passage comprises a first flow passage, a second flow passage, and a third flow passage, and further wherein an end of the first flow passage and an end of the second flow passage meet each other at one meeting point, the first and second flow passages having almost the same length,
   wherein the other end of the first flow passage is in communication with a first liquid reservoir having a volume of 5 to 5000 mm$^3$,
   wherein the other end of the second flow passage is in communication with a second liquid reservoir having a volume of 5 to 5000 mm$^3$, and
   wherein an end of the third flow passage is in communication with the meeting point, the other end of the third flow passage being in communication with a third reservoir having a volume of 5 to 5000 mm$^3$.

8. The evaluation apparatus of scientific phenomena according to claim 7, wherein in the cover plate there is formed a through hole that permits communication of outside air with at least one of the first reservoir, the second reservoir and the third reservoir.

9. An educational tool for scientific experiments in which the evaluation apparatus of scientific phenomena of claim 1 is a portable experiment apparatus.

10. An educational tool for scientific experiments in which the evaluation apparatus of scientific phenomena of claim 2 is a portable experiment apparatus.

11. A method of manufacturing the evaluation apparatus of scientific phenomena of claim 1, comprising the steps of:
   applying a resin material to a surface of a reverse template on the surface of which a reverse shape of the elongated groove of the base plate is formed;
   causing the resin material to cure; and
   stripping the resin material after curing from the reverse template thereby to form the base plate.

12. A method of manufacturing the evaluation apparatus of scientific phenomena of claim 2, comprising the steps of:
   applying a resin material to a surface of a reverse template on the surface of which a reverse shape of the elongated groove of the base plate is formed;
   causing the resin material to cure; and
   stripping the resin material after curing from the reverse template thereby to form the base plate.

13. A method of manufacturing the evaluation apparatus of scientific phenomena of claim 1, comprising:
   the base plate forming step that involves, by use of a reverse template on the surface of which a reverse shape of the elongated groove to be formed on the base plate is formed, applying a resin material to a surface of the reverse template, causing the resin material to cure, and stripping the resin material after curing from the reverse template thereby to form the base plate;
   the fitting step that involves fitting the cover plate against the surface of the base plate to cover the elongated groove, whereby the fine flow passage is formed on the base plate; and
   the casing mounting step that involves mounting a casing to the base plate and the cover plate that are fitted against each other and supporting the base plate and the cover plate so as to sandwich the plates, whereby the base plate and the cover plate are brought into close contact with each other.

14. A method of manufacturing the evaluation apparatus of scientific phenomena of claim 2, comprising:
   the base plate forming step that involves, by use of a reverse template on the surface of which a reverse shape of the elongated groove to be formed on the base plate is formed, applying a resin material to a surface of the reverse template, causing the resin material to cure, and stripping the resin material after curing from the reverse template thereby to form the base plate;
   the fitting step that involves fitting the cover plate against the surface of the base plate to cover the elongated groove, whereby the fine flow passage is formed on the base plate; and
   the casing mounting step that involves mounting a casing to the base plate and the cover plate that are fitted against each other and supporting the base plate and the cover plate so as to sandwich the plates, whereby the base plate and the cover plate are brought into close contact with each other.

15. A method of manufacturing the evaluation apparatus of scientific phenomena of claim 1, comprising:
   the base plate forming step that involves forming the elongated groove on the surface of the base plate by a micromachining process of machine-working;
   the fitting step that involves fitting the cover plate against the surface of the base plate to cover the elongated groove, whereby the fine flow passage is formed on the base plate; and
   the casing mounting step that involves mounting a casing to the base plate and the cover plate that are fitted against each other and supporting the base plate and the cover plate so as to sandwich the plates, whereby the base plate and the cover plate are brought into close contact with each other.

16. A method of manufacturing the evaluation apparatus of scientific phenomena of claim 2, comprising:
   the base plate forming step that involves forming the elongated groove on the surface of the base plate by a micromachining process of machine-working;
   the fitting step that involves fitting the cover plate against the surface of the base plate to cover the elongated groove, whereby the fine flow passage is formed on the base plate; and
   the casing mounting step that involves mounting a casing to the base plate and the cover plate that are fitted against each other and supporting the base plate and the cover plate so as to sandwich the plates, whereby the base plate and the cover plate are brought into close contact with each other.

17. A method of manufacturing the evaluation apparatus of scientific phenomena of claim 1, comprising:
   the base plate forming step that involves, by use of a reverse template on the surface of which a reverse shape of the elongated groove to be formed on the base plate is formed, applying a resin material to a surface of the reverse template, causing the resin material to cure, and stripping the resin material after curing from the reverse template thereby to form the base plate;
   the fitting step that involves fitting the cover plate against the surface of the base plate to cover the elongated groove, whereby the fine flow passage is formed on the base plate; and
   the casing mounting step that involves applying a pair of transparent holder plates to both sides of the base plate and the cover plate that are fitted against each other and connecting the holder plates together by use of a connecting device so as to be sandwiched, whereby the base plate and the cover plate are brought into close contact with each other.

18. A method of manufacturing the evaluation apparatus of scientific phenomena of claim 2, comprising:
- the base plate forming step that involves, by use of a reverse template on the surface of which a reverse shape of the elongated groove to be formed on the base plate is formed, applying a resin material to a surface of the reverse template, causing the resin material to cure, and stripping the resin material after curing from the reverse template thereby to form the base plate;
- the fitting step that involves fitting the cover plate against the surface of the base plate to cover the elongated groove, whereby the fine flow passage is formed on the base plate; and
- the casing mounting step that involves applying a pair of transparent holder plates to both sides of the base plate and the cover plate that are fitted against each other and connecting the holder plates together by use of a connecting device so as to be sandwiched, whereby the base plate and the cover plate are brought into close contact with each other.

19. A method of manufacturing the evaluation apparatus of scientific phenomena of claim 1, comprising:
- the base plate forming step that involves the elongated groove is formed on the surface of the base plate by a micromachining process of machine-working;
- the fitting step that involves fitting the cover plate against the surface of the base plate to cover the elongated groove, whereby the fine flow passage is formed on the base plate; and
- the casing mounting step that involves applying a pair of transparent holder plates to both sides of the base plate and the cover plate that are fitted against each other and connecting the holder plates together by use of a connecting device so as to be sandwiched, whereby the base plate and the cover plate are brought into close contact with each other.

20. A method of manufacturing the evaluation apparatus of scientific phenomena of claim 2, comprising:
- the base plate forming step that involves the elongated groove is formed on the surface of the base plate by a micromachining process of machine-working;
- the fitting step that involves fitting the cover plate against the surface of the base plate to the elongated groove, whereby the fine flow passage is formed on the base plate; and
- the casing mounting step that involves applying a pair of transparent holder plates to both sides of the base plate and the cover plate that are fitted against each other and connecting the holder plates together by use of a connecting device so as to be sandwiched, whereby the base plate and the cover plate are brought into close contact with each other.

* * * * *